June 2, 1953  E. D. McARTHUR  2,640,922
FREQUENCY RESPONSE SYSTEM
Filed July 26, 1949  2 Sheets-Sheet 1
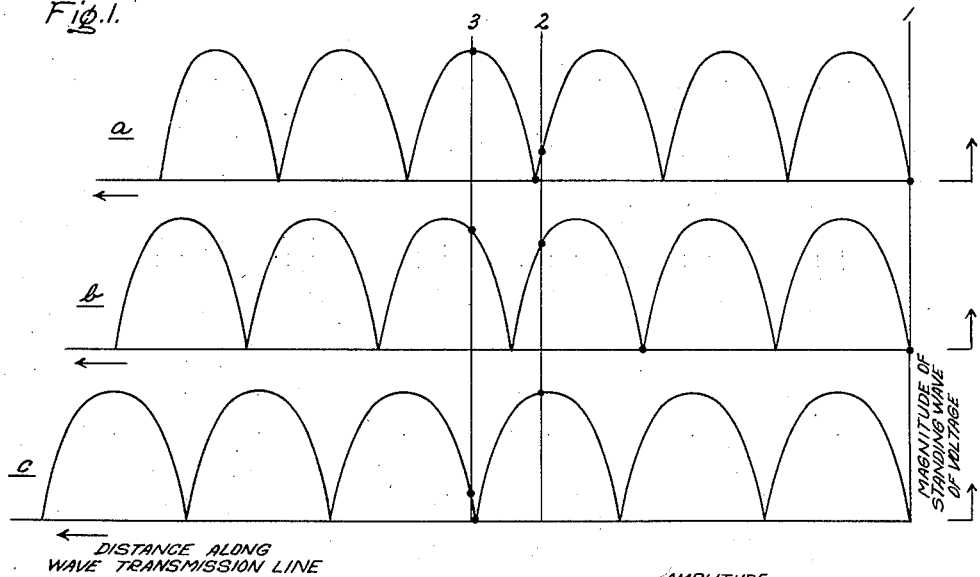
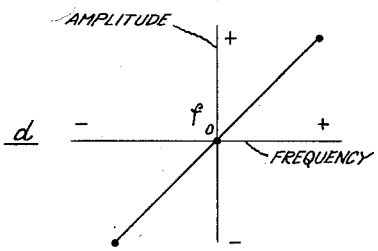
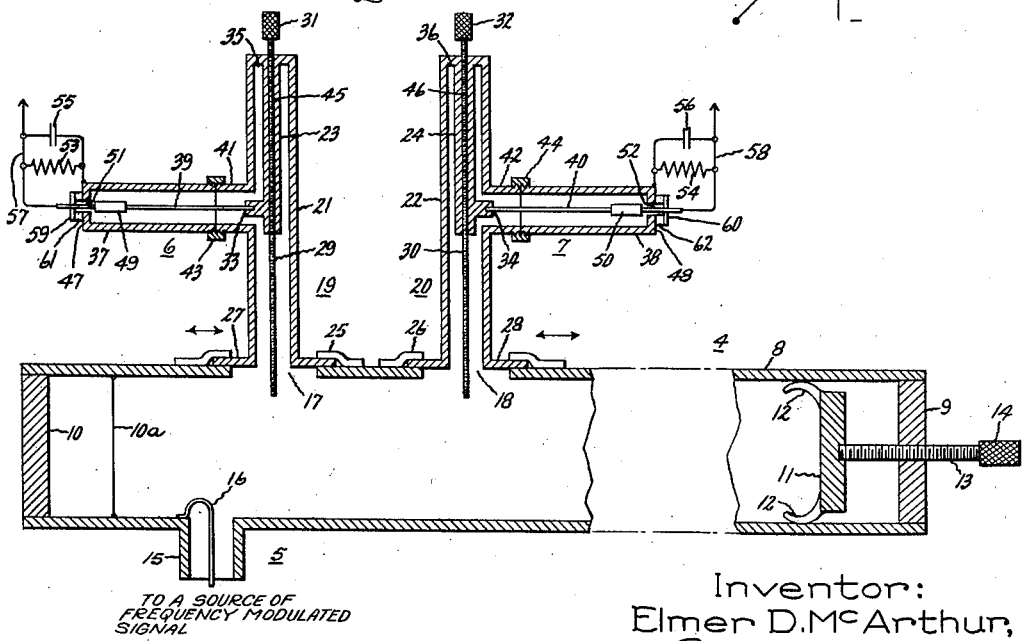
Inventor:
Elmer D. McArthur,
by Richard E. Hosley
His Attorney.

June 2, 1953  E. D. McARTHUR  2,640,922
FREQUENCY RESPONSE SYSTEM
Filed July 26, 1949  2 Sheets-Sheet 2
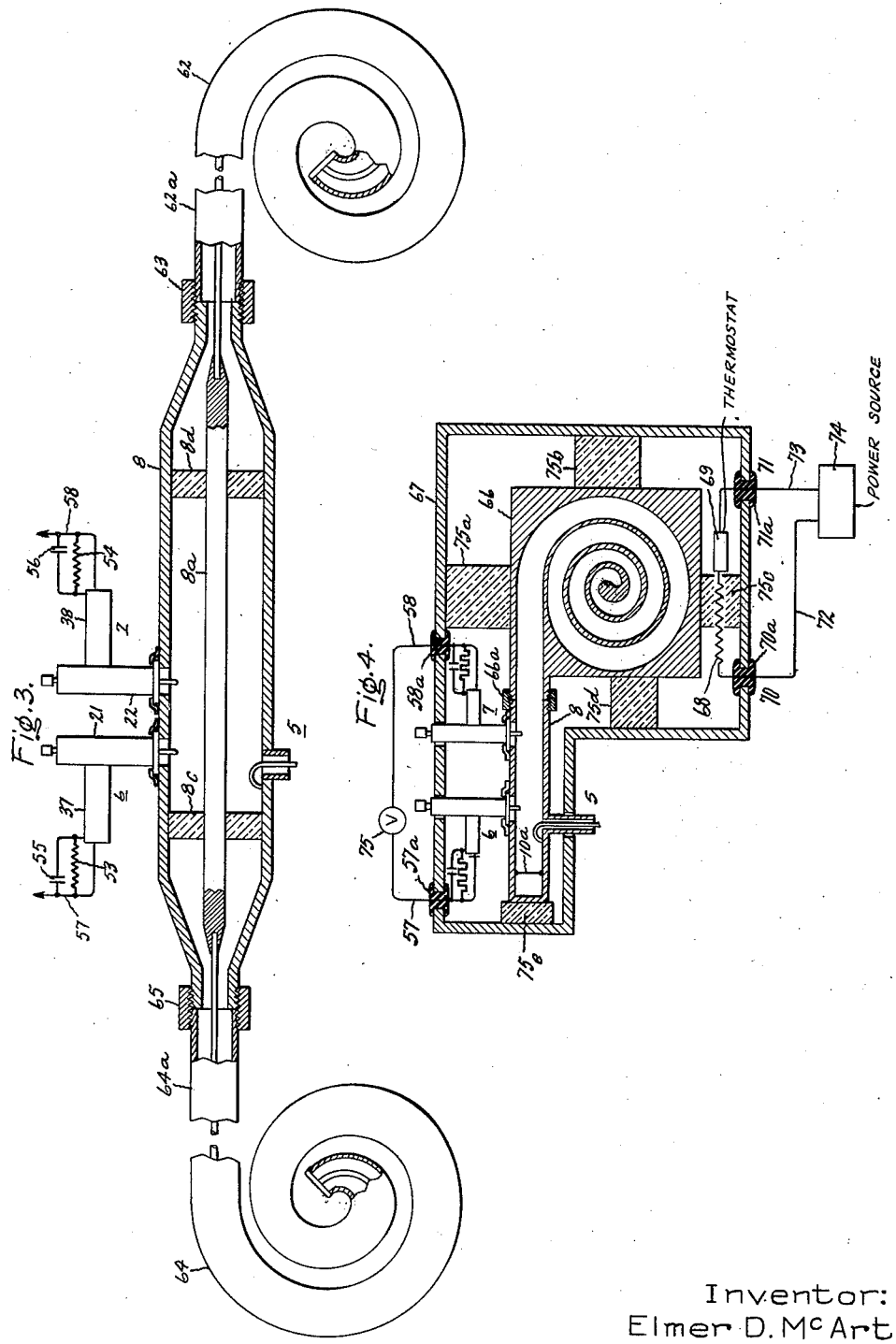
Inventor:
Elmer D. McArthur,
by Richard E. Hosley
His Attorney.

Patented June 2, 1953

2,640,922

UNITED STATES PATENT OFFICE 2,640,922

FREQUENCY RESPONSE SYSTEM

Elmer D. McArthur, Schenectady, N. Y., assignor to General Electric Company, a corporation of New York Application July 26, 1949, Serial No. 106,842

2 Claims. (Cl. 250—27)

The present invention relates in general to frequency response systems and in particular relates to method and apparatus for detecting frequency or phase changes in electromagnetic energy.

Frequency detection systems are used in many ways. They are used to indicate frequency departures from a predetermined frequency; they are used to maintain a resonant circuit at a resonant frequency of predetermined value; they are used as detectors in frequency modulation receivers; they are used in automatic frequency control systems.

Frequency detection systems commonly make use of tuned circuits such as resonant combinations of inductance and capacity and their equivalents in a manner well known in the art. The frequency sensitivity of apparatus making use of tuned circuits is dependent upon the sharpness of the frequency response characteristic of the tuned circuits. The sharpness of the frequency response characteristic of tuned circuits is, in turn, limited by the power losses, such as the resistive losses, in the tuned circuit. The power losses can be reduced by judicious design of the tuned circuits; however, there is a physical limitation in the extent power losses in the tuned circuit can be reduced, and consequently, there is a limitation in the frequency sensitivity of a frequency detection system utilizing conventional tuned circuits.

In certain applications, for instance in radar systems utilizing the Doppler principle, it is desirable to detect frequency variations of a few cycles in several hundred million cycles. The tuned circuit variety of frequency response circuit is unsuitable for this type of use because of the physical limitations aforementioned.

A general object of this invention is to overcome the above-mentioned shortcomings of prior art frequency detectors and to provide a new and improved method and apparatus for the detection of frequency changes in electromagnetic energy. By means of the method and apparatus of the invention, higher sensitivity, for frequency variations than can be achieved with conventional tuned circuits or cavity resonators, is obtained. Another object of the invention is to provide a frequency discriminator circuit for use in the ultra high frequency range of the electromagnetic wave spectrum. A further object of the invention is to provide frequency response apparatus that is simple to construct and to adjust and which requires a minimum of adjustments.

In general the invention makes use of the fact that a shift of a point on a standing wave pattern in a transmission line due to a change in frequency is greater when the aforementioned point is farther from the discontinuity causing the standing wave pattern. The invention embodies this principle in method and apparatus for the detection of frequency variations in electromagnetic energy, particularly small variations in frequency at the high frequency end of the electromagnetic spectrum.

The features of the invention which are novel are pointed out with particularity in the appended claims. The invention itself together with its further objects and advantages may best be understood by reference to the following description taken in connection with the accompanying drawings in which Fig. 1 is a diagram illustrating the principles upon which the present invention is based; Fig. 2 is an elevation view in section of a practical device embodying the invention; Fig. 3 is an elevation view in section of another practical device embodying the invention; Fig. 4 is a cross sectional view of apparatus embodying the invention in a frequency standard.

Referring now to Figs. 1a, 1b and 1c there are shown diagrammatic representations of the standing waves of voltage along a wave transmission line when the transmission line is short circuited at a point corresponding to point I on the diagram. Figs. 1a, 1b and 1c progressively show how the standing wave expands or shifts as the frequency of the exciting signal in the transmission line is decreased. It is in part on this standing wave phenomenon upon which the operation of the invention depends. Considering this phenomenon in more detail, a short circuit on a wave transmission or translating means, such as a transmission line or wave guide, causes the magnitude of the root mean square voltage of the exciting signal to vary periodically along the wave transmission means. A voltage node or minimum point is located at the short circuit I and every half wave length interval therefrom. Fig. 1a shows the shift with respect to the center frequency, represented by Fig. 1b, in the standing wave pattern of voltage caused by an increase in the frequency of the driving voltage. Since the nodes of the standing wave pattern of voltage must be a half wavelength apart and since the first node is at the short circuit a larger number of nodes are formed within a given length of transmission line when the frequency is increased. Fig. 1c shows the shift in the standing wave pattern when the frequency is decreased. At this frequency a smaller number of nodes are formed within a given section of the wave transmission means than at the center frequency.

Now considering how functionally this phenomenon may be utilized in frequency response systems, consider the points 2 and 3 which for the purposes of this explanation are fixed on the wave transmission means. At the center frequency represented in Fig 1b, the voltages at points 2 and 3 are almost equal. As the frequency is increased the voltage at point 2 drops and the voltage at point 3 rises. As the frequency decreases the voltage at point 2 rises and the voltage at point 3 drops. It is seen that by rectifying the voltages at 2 and 3 and by measuring the difference of the rectified voltages, a frequency response characteristic, such as shown in Fig 1d can be obtained. At the center frequency the output from the detector circuit is zero. As the frequency is increased, the output has one polarity and as the frequency is decreased the output has the opposite polarity.

In actual practice the standing wave patterns differ from the wave patterns shown in Fig. 1 because of power dissipation in the physical components of the wave transmission or translating means. The cusp form of the curve in the vicinity of the minimum voltage points becomes a smooth curve of gradually changing curvature and in addition the minimum value of the curve does not extend to the zero voltage axis but departs slightly from it. However, these differences do not affect the application of the above-described phenomenon for the purposes of the invention.

It is readily appreciated that the farther the points 2 and 3 are from the short the greater will be the voltage change through which the points 2 and 3 pass for a given change of frequency; and thus a system of high sensitivity for frequency variations could be devised by using a long length of line with respect to the wavelength of the energy used to drive the line. It is readily appreciated by those skilled in the art that a substantial discontinuity at point 1 other than a short circuit will also produce a substantial standing wave pattern on the transmission line which behaves with frequency in a manner very similar to the manner described above.

Referring to Fig. 2, there is shown an embodiment of the invention comprising a wave transmission means 4 short circuited by member 11, means 5 for coupling energy into the wave transmission means 4, and probe means 6 and 7 for detecting the shift in the standing wave pattern along the wave transmission means. The wave transmission means 4 comprises a tubular conductor member 8 suitably terminated at each end in conductors 9 and 10. The member 8 may be rectangular, circular or any other suitable form. Tuning conductor member 11 with fingers 12 is located at one end of member 8 and serves to short circuit one end of said wave transmission means so as to reflect energy back from member 11. Tuning conductor member 11 is movable along the tubular conductor member 8. To the tuning conductor member 11 is connected, as by soldering, rod member 13 which engages with conductor 9 through threads so that by turning the knurled knob 14 which is suitably connected to the rod 13 the tuning conductor member 11 may be moved along the tubular member 8 so as to mechanically shift a standing wave pattern in member 8. In place of the member 11 and its associated adjusting mechanism equivalents well known in the art may be used, for instance choke pistons. Approximately one-quarter of a wavelength at the center frequency of operation from member 10 is located an impedance member 10a having a wave impedance equal to the characteristic or surge impedance of member 8 so that there would be little reflection from this end of member 8. In general a termination at this end in the characteristic impedance of the guide or in any non-reflecting means will function satisfactorily.

Energy is coupled into the wave transmission means 4, from a source which varies in frequency, by means of coupling means 5 which may comprise a section of transmission line 15 terminated in a loop 16. Coupling means 5 is preferably located near the end of the transmission means 4, away from the tuning conductor 11.

A shift in the standing wave pattern along the conductor member 8 caused by a change in frequency of a signal supplied through loop 16 is detected by the probe means 6 and 7 which are connected to the tubular conductor member 8. Stub transmission lines 19 and 20 are mounted on the external surface of the tubular conductor member 8 registering with the apertures 17 and 18. The stub transmission lines 19 and 20 comprise tubular metallic outer conductors 21 and 22 and centrally disposed inner conductors 23 and 24. Means for mounting the stub transmission lines 19 and 20 on the external surface of conductor comprises retainer members 25 and 26, which extend around the apertures 17 and 18 and are attached to member 8. The flange portions 27 and 28 of the stub transmission lines 19 and 20 are slideably held between the retainer members 25 and 26 and the outer surface of the member 8. The conductors 23 and 24 are internally threaded to receive the threaded probes 29 and 30, to which are connected the knurled knob members 31 and 32.

Connected across the stub transmission lines 19 and 20 at the points 33 and 34 between the short circuits 35 and 36 and the openings 17 and 18 are output circuits comprising transmission lines having tubular outer conductors 37 and 38 and centrally disposed inner conductors 39 and 40. The conductors 37 and 38 are connected to the outer conductors 21 and 22 of the stub transmission line through short sleeves 41 and 42 formed integrally with the outer conductors 21 and 22. The conductors 39 and 40 may be joined as by soldering to the inner conductors 23 and 24. The outer conductors 37 and 38 and the sleeves 41 and 42 may be externally threaded and held together by means of fasteners 43 and 44.

Electromagnetic energy is transferred from the wave transmission means 4 to the stub transmission lines 19 and 20 by means of probes 29 and 30 which extend into the space defined by tubular conductor member 8. These probes 29 and 30 comprise a conductive rod which passes through the longitudinal bores 45 and 46 in the inner conductors 23 and 24. The bores 45 and 46 in conductors 23 and 24 may be threaded if desired so that the end of the probes 29 and 30 may be adjusted by means of knurled knobs 31 and 32 attached to the end of the probes 29 and 30. In the arrangement described the point of connection of the elements 39 and 40 to conductors 23 and 24 is selected so that the distance from the points 33 and 34 to the short circuits 35 and 36 is equal to approximately a quarter wavelength or an odd multiple of a quarter wavelength of the electromagnetic wave present in the wave transmission means comprising conductor 8. With this construction the stub transmission line appears as a high impedance for the high frequency electromagnetic energy so that this energy travels over transmission lines 39, 41 and 40, 42 to the output circuits. The conductors 37, 39 and 38, 40 of the output circuits are terminated in shorting members 47 and 48 spaced approximately one quarter of a wavelength from the points 33 and 34. Integral with the inner conductors 39 and 40 are soldered the crystal rectifier members 49 and 50. The other ends of crystal rectifier members 49 and 50 are connected to conductors 57 and 58 which extend through apertures 51 and 52 in members 47 and 48. A by-pass capacitor comprising respectively plates 47, 59 and dielectric 61, and plates 48, 60 and dielectric 62 bypasses the conductors 57 and 58 to ground. Load resistors 53 and 54 and filter capacitors 55 and 56 are connected at one end to the conductor members 39 and 40 and at the other end to members 37 and 38. The output of the frequency response system is taken between conductors 57 and 58. It is appreciated by those skilled in the art that there are other ways of connecting rectifier crystals to apparatus such as shown in Fig. 2 and any of these in general would be suitable for the purposes of the invention.

A minimum of adjustments are necessary to ready the above device for operation to detect frequency variations or deviations of the applied signal. The general object of the adjustments is to dispose the probes 29 and 30 with respect to the standing wave pattern within the device so that at the center frequency the voltage output between points 57 and 58 is subsantially zero. One way to achieve this general object is, first, to adjust probes 29 and 30 by means of knob members 31 and 32 so that they extend the same distance into the member 8. It is desirable not to locate probes 29 and 30 too far within the member 8 in order to maintain at a minimum any disturbance in the wave propagation properties of the conductor member 8. The probes are next adjusted with respect to each other until they are approximately one-quarter of a wavelength apart at the center frequency of operation of the device. Finally, the device is energized by a center frequency signal and by adjusting the shorting element 11 the standing wave pattern in the energized device is moved so that the probes pick up the same magnitude of voltage from adjacent lobes of the standing wave pattern; thus at the center frequency the voltage between points 57 and 58 is substantially zero. The device is now ready for operation. If the frequency of a signal supplied to the device departs from the center frequency, a unidirectional voltage is developed between points 57 and 58. The polarity and magnitude of this voltage depends on the direction and the magnitude of the frequency departure.

It is readily appreciated that for large frequency departures the probes are caused to move into the curve portions of the lobes of the standing wave pattern; hence, in this region the output between points 57 and 58 would not vary directly with frequency departure. There is thus an optimum spacing of the probes to make best use of the substantially linear, as distinguished from the curved, portions of the lobes of the standing wave patterns. This optimum spacing appears to be of the order of a quarter of a wavelength at the center frequency, if one wishes to retain linearity at the expense of range.

Variations in the construction of the specific device shown in Fig. 2 readily suggest themselves. The adjustable element 11 could be eliminated and the adjustment function of this element could be assumed by probe assemblies 6 and 7, i. e. probe assemblies 6 and 7 could be moved together until the condition of null reading is obtained between points 57 and 58.

It should be noted that the zero setting of the apparatus is independent of any ampltiude variations of the applied voltage.

The performance of the above-described apparatus may be analyzed mathematically and design equations developed, to facilitate its construction and use. It is readily shown by one skilled in the art, that the following relationship exists with respect to the phenomenon on which the invention depends:

$$|V_d| = 2A \cos \frac{\pi d}{\lambda} \sin n\pi \frac{\lambda_0}{\lambda} \quad (1)$$

where $|V_d|$ is the absolute magnitude of the difference in the rectified voltages obtained at points 2 and 3. $d$ is the distance between points 2 and 3. $\lambda_0$ is the wavelength of electromagnetic energy at which the voltages at each of the points 2 and 3 with respect to ground are equal; and hence the wavelength at which the rectified voltage between points 2 and 3 is zero. $n$ is the number of wavelengths between the discontinuity 1 and a point midway between points 2 and 3 at the wavelength $\lambda_0$. $\lambda$ is any wavelength of electromagnetic energy that produces a shift in the standing wave pattern so as to produce a net voltage difference between points 2 and 3.

The relationship (1) may be expressed in terms of frequency as well as wavelength. Thus, $$V_d = \pm 2A \cos \frac{\pi d}{\lambda} \sin n\pi \frac{f}{f_0} \quad (2)$$

In this relationship, $f_0$=frequency corresponding to $\lambda_0$, and
$f$=frequency corresponding to $\lambda$.

It readily follows from Equation 2 that $$V_d = +2A \cos \frac{\pi d}{\lambda} \sin n\pi\delta \quad (3)$$

where $\delta$ is defined by the relationship $$f = f_0 + \delta f_0$$

For values $\delta$ which make $n\pi\delta$ less than 30°, the $\sin n\pi\delta$ is approximately linear and hence may be replaced by $Kn\pi\delta$, where $K$ is a constant of proportionality. The smaller the value of $\delta$ the better is the approximation. By substitution of this approximation in Equation 3 it is readily shown that $$V_d = 2K\pi An\delta \cos \frac{\pi d}{\lambda} \quad (4)$$

By evaluating the constant $k$ by noting that when $n\pi\delta = 30°$, $\sin n\pi\delta = .5$, it is readily shown that $$V_d = 6An\delta \cos \frac{\pi d}{\lambda} \quad (5)$$

Since the factor $$\cos \frac{\pi d}{\lambda}$$

does not change appreciably as $\lambda$ or the frequency changes, it is readily appreciated that $V_d$ varies quite linearly with the change in frequency as shown in Fig. 1, provided the change in frequency is not sufficiently great so that either points 2 and 3 are in curved regions of the standing wave lobes. It is readily appreciated that as the frequency is changed through large values the output between points 2 and 3 would cyclically change.

The maximum frequency shift that can be tolerated for any value of probe spacing is that which will move the voltage minimum located between points 2 and 3 to point 2 on one side as the frequency is increased and to point 3 on the other side as the frequency is decreased.

It may be easily shown that when the maximum deviation in frequency $\delta_m f_0$ is a small part of the center frequency $f_0$ that $$\frac{\delta}{\lambda} = n\delta_m$$

to a close approximation. Hence by substitution of the above relationship in Equation 3 it is readily apparent that $$V\delta_m = A \sin 2n\pi\delta_m \quad (6)$$

where $V\delta_m$ = voltage deviation corresponding to frequency deviation $\delta_m f_0$ and $A$ = a constant.

It may be further shown from Equation 3 when the deviation $\delta_m$ is small that $$V\delta_m = 6nA\delta_m \cos \pi n\delta_m \quad (7)$$

and hence the frequency sensitivity S of the device would be $$S = \frac{V_{\delta_m}}{f_0 \delta_m} = \frac{6nA}{f_0} \cos \pi n\delta_m \frac{\text{volts}}{\text{cycle shift}} \quad (8)$$

From the above equation it is readily apparent that the sensitivity can be increased at will to very large values determined by the magnitude of the factor $n$ by making the structure supporting the standing wave long. It should be noted that circuit resistivity is not a limiting factor in the above equation which sets forth the factors affecting sensitivity. In simple cavity resonators, or tuned circuits of the usual type frequency sensitivity is limited by the circuit resistivity.

Referring now to Fig. 3, there is shown another embodiment of the invention by means of which the over-all dimensions of the apparatus are kept at a minimum. The conductor 8 and conductor 8a supported by insulators 8c and 8d comprise a short section of coaxial transmission line which is adapted in a manner similar to the member 8 of Fig. 2 to receive the probe assemblies 6 and 7 and the coupling means 5. In order to minimize the space occupied by the apparatus it is desirable to make the section of transmission line 8, 8a quite short. At one end of the section 8, 8a a length of flexible coaxial transmission line 62 of low loss shorted at the far end is attached to the section 8, 8a, through a standard fitting 63 and through end connector 62a of transmission line 62. At the other end of the section 8, 8a a length of lossy coaxial transmission line 64 is connected through a standard fitting 65 and through end connector 64a of transmission line 64. The section of transmission line 8, 8a is suitably tapered at both ends so that the characteristic impedance of the section 8, 8a matches the characteristic impedance of the flexible transmission lines 62 and 64. The flexible transmission line is coiled up to conserve space.

The device shown in Fig. 3 functions in a manner similar to the device of Fig. 2.

The chamber comprising member 8 in Fig. 2 and comprising members 8 and 8a in Fig. 3 can be used as mixing chambers for mixing signals of different frequencies. In certain applications, it is desirable to heterodyne or mix two different frequencies. Applicant's apparatus is suitable for this purpose. In addition to the heterodyning function, the apparatus could at the same time serve as a frequency discriminator or detector. When used in this way, the two frequencies preferably may be supplied to the chambers through the coupling means 5.

The invention may also be used as a frequency monitoring apparatus or as a frequency standard. When used as a frequency standard, it is desirable to control the temperature of the apparatus in order to maintain the dimensions of the apparatus constant so that a uniform response will be obtained for a given frequency. In Fig. 4 is shown the invention embodied in the form of a frequency standard. The apparatus shown in this figure is in general similar to the apparatus shown in Fig. 2. The section of wave guide between the probe means 6 and 7 and the short circuited end of the wave guide is rolled into the form of a spiral to conserve space and to facilitate the maintenance of the wave guide at a constant temperature. The block 66 comprising the rolled-up wave guide can be constructed in ways well known to those skilled in the art. For the purposes of this invention, any of these ways would in general be suitable. The block 66 is connected to the member 8 by means of fitting 66a. In order to maintain the wave guide and associated apparatus at a constant temperature, the apparatus is enclosed in a container 67, which may be made of metal or any other suitable material which will permit maintaining the apparatus at a constant temperature. The block 66 and associated components are maintained in a fixed position within the container 67 by means of supporting blocks 75a, 75b, 75c, 75d and 75e. The temperature of the wave guide and the atmosphere inside the container 67 is maintained at a constant temperature by means of the heater 68, thermostat 69 and a source of electric power 74, which is connected to the heater and thermostat by means of conductors 72 and 73 extending through openings 70 and 71 in the container 67 and insulated therefrom by insulating members 70a and 71a. For purposes of adjustment, the top portions of assemblies 6 and 7 extend through the container at the top thereof. The coupling means 5 also extends through the container so that energy may be supplied to the apparatus. A direct current voltmeter is connected between points 57 and 58 through insulating members 57a and 58a to indicate frequency departure.

The apparatus is calibrated by first energizing the heater 68 and waiting until the temperature of the apparatus has attained a constant value which is determined by the setting of the thermostat 69. A standard signal is then supplied to the apparatus through the member 5. The probe assemblies 6 and 7 are then adjusted until a null reading is obtained on the meter 75. The apparatus is now ready for operation. If an unknown signal is supplied to the apparatus, it is readily determined by observation of the meter 75 whether it is the same frequency or a greater frequency or a lower frequency than the standard frequency. By calibrating the apparatus on several standard frequencies, the meter 75 may be calibrated to indicate not only the departure of the unknown frequency from a standard frequency but also the extent of this frequency departure. Procedures for doing this are readily apparent to those skilled in the art.

While I have shown and described my invention as applied in and by particular apparatus, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. Apparatus for producing a signal responsive to frequency deviations from a given center frequency comprising an elongated cavity resonator, one end wall of said resonator comprising a reflective member and the opposite end wall comprising an absorptive member, means for coupling energy into said resonator at an intermediate point along its length so that energy is reflected by said reflective member and absorbed by absorptive member, a pair of probe means separated along the length of said cavity resonator by substantially one-fourth wave length at said center frequency to provide a continuing differential signal from said probe means to detect the shift in magnitude and direction of the standing wave pattern in said cavity due to a change in frequency of the energy coupled into said resonator, said probe means located a distance equivalent to several wave lengths at said center frequency from said reflective wall to detect large changes in signal for small variations of frequency.

2. In combination a section of concentric transmission line, a length of lossy flexible coaxial transmission line connected to one end of said section of concentric transmission line, a long length of flexible coaxial transmission line of low loss shorted at the far end connected to the other end of said transmission line, means for coupling electromagnetic energy into said section of concentric transmission line, and means for detecting the sense and the magnitude of the shift in the standing wave pattern along the section of concentric transmission line comprising a pair of probes separated on said section of concentric transmission line by a distance substantially equal to ¼ wavelength of the standing wave pattern.

ELMER D. McARTHUR.

References Cited in the file of this patent

UNITED STATES PATENTS

| Number | Name | Date |
|---|---|---|
| 2,151,118 | King et al. | Mar. 21, 1939 |
| 2,413,939 | Benware | Jan. 7, 1947 |
| 2,419,208 | Franz et al. | Apr. 22, 1947 |
| 2,420,892 | McClellan | May 20, 1947 |
| 2,442,606 | Korman | June 1, 1948 |
| 2,498,548 | Howard | Feb. 21, 1950 |
| 2,522,563 | Blitz | Sept. 19, 1950 |